United States Patent [19]

Hervig

[11] 4,164,620
[45] Aug. 14, 1979

[54] INSULATIVE CORONA DISCHARGE SUPPRESSING SHEATH FOR HIGH VOLTAGE CABLE SPLICES

[75] Inventor: Harold C. Hervig, Maplewood, Minn.

[73] Assignee: Minnesota Mining and Manufacturing Company, St. Paul, Minn.

[21] Appl. No.: 940,356

[22] Filed: Sep. 7, 1978

[51] Int. Cl.² .......................................... H02G 15/08
[52] U.S. Cl. ................................................. 174/73 R
[58] Field of Search ........................... 174/73 R, 73 SC

[56] References Cited

U.S. PATENT DOCUMENTS

| | | | |
|---|---|---|---|
| 3,585,568 | 6/1971 | Hervig et al. | 174/73 R X |
| 3,612,746 | 10/1971 | Sankey | 174/73 R |
| 4,034,151 | 7/1977 | Silva et al. | 174/73 R |
| 4,079,189 | 3/1978 | Troccoli | 174/73 R |

Primary Examiner—Laramie E. Askin
Assistant Examiner—E. F. Borchelt
Attorney, Agent, or Firm—Cruzan Alexander; Donald M. Sell; Terryl K. Qualey

[57] ABSTRACT

Insulative sheath for high voltage cable splices has inner semiconductive member with inwardly directed bosses for positioning the sheath radially of the cable and splice and for contacting the connector of the splice to suppress corona discharge.

2 Claims, 13 Drawing Figures

INSULATIVE CORONA DISCHARGE SUPPRESSING SHEATH FOR HIGH VOLTAGE CABLE SPLICES

This invention relates to a high voltage cable splice and to an improved anticorona discharge shielding insulator for high voltage cable splices and to methods of fabricating such insulators.

In the transmission of currents at high voltage and particularly in distribution systems which are underground, numerous splices or connections are necessary. These are conveniently effected using metallic sleeves crimped to bare ends of the cables followed by applying suitable insulation and shielding. Other methods have been used as described in some detail in U.S. Pat. No. 4,079,189. As recognized in that patent, a major problem in such splices is the occurrence of corona discharge in air pockets around the splice. Such discharge tends to deteriorate cable insulation and create interference at many wavelengths of radio emission, i.e. static. Suppression of the discharge is therefore most important.

In U.S. Pat. No. 4,079,189 an insulator is provided with inner and outer semiconductive sections and end caps and an intermediate insulative section. The inner semiconductive section has a plurality of circumferentially spaced ribs extending inwardly. The ribs extend over a major portion of a crimped metallic connector of cable ends and contact the connector under compression as a result of deformation and bending. It would appear that insulators as described might be difficult to fabricate using a molded inner semiconductive ribbed section. It would further appear that the force with which the ribs contact the connector might be relatively weak. It is an object of the present invention to provide an insulator for splices of high voltage cables which is readily manufactured and provides good insulation and suppression of corona discharge.

In accordance with the above and other objects of the invention it has been found that a convenient and efficient process for the production of insulating corona discharge suppressing shields for splices of high voltage lines comprises the steps of applying a tube of semiconductive elastomeric material having a wall of substantially uniform thickness to a mandrel having a pattern of depressions in a raised portion thereof, placing on said mandrel, positioned apart from said tube, end caps of generally elongated tubular form having outer and inner ends and having outer termination segments distal to said tube of uniform internal and external diameter and inner enlarged segments having variable external diameter and internal diameter varying from being equal to the internal diameter of said terminal segment to being greater than the external diameter of said terminal segment, placing a form or mold having a sprue opening at least around and between the enlarged segments of said end caps and injecting elastomer composition curable to insulative material through said sprue hole around said semiconductive tube and in said end caps while forcing said tube into the depressions in said mandrel. In a preferred embodiment of the invention the outer end of the termination segment of each end cap is formed with at least double undercutting toward the internal diameter as further described below. After addition of an outer annular semiconductive cover extending onto and between the enlarged segments of said end caps, there is obtained an insulative corona discharge suppressing shield for positioning over and along a splice in high voltage cable of generally circular cross section having semiconductive covering and insulating covering and an inner conductor and having an electrical connector electrically joining two bare ends of said conductor, said shield comprising two end caps having openings therein adapted to engage said semiconductive covering electrically, annular inner and outer semiconductive sections and an insulative section having inwardly directed bosses over at least a portion thereof extending inward and being integrally bonded at least to said inner semiconductive section and said end caps, said inner semiconductive section having a wall of substantially uniform thickness and further being urged inwardly by said bosses into electrical contact with said electrical connector when said shield is positioned on a high voltage cable splice.

It is found advantageous to have an inner semiconductive section of substantially uniform wall thickness to facilitate sliding of and positioning the sleeve over cables because the lesser stiffness over molded protuberances of semiconductive material permits easier deformation during installation. The urging inwardly of the inner semiconductive section by bosses provides superior electrical contact and enhances the reliability of the installed sleeve.

The invention is now more fully explained by reference to the drawings, wherein

Figure 1:
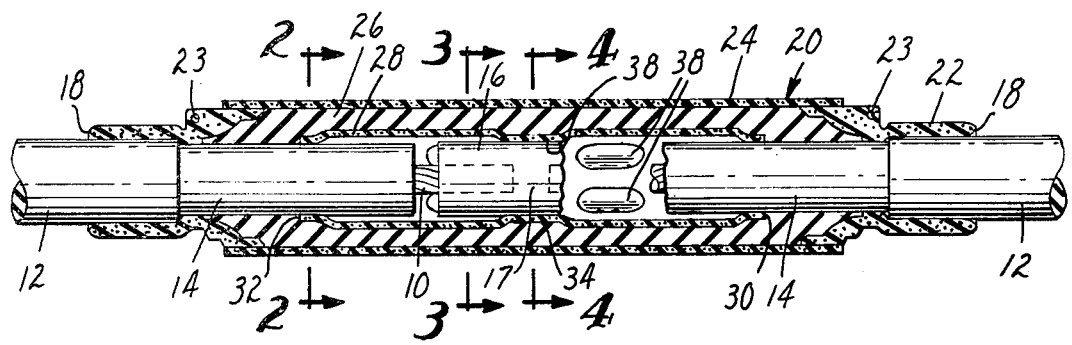
FIG. 1 is a longitudinal sectional view through an insulative sheath of the invention in place over a cable splice.
Figure 2:
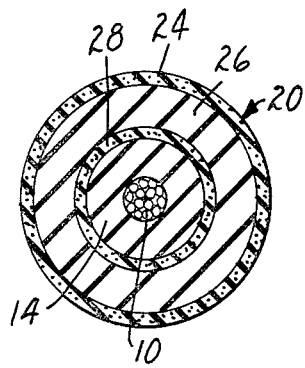
FIGS. 2, 3 and 4 are cross sectional views of an insulative sheath of FIG. 1 at 2—2, 3—3 and 4—4 respectively.
Figure 3:
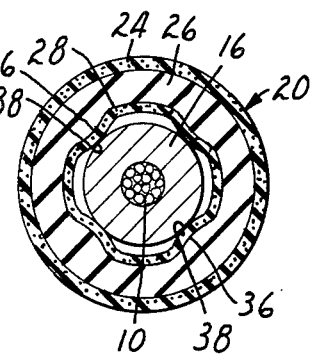
Figure 4:
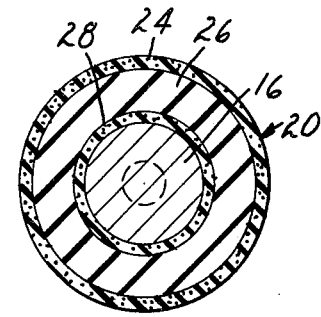

Referring to FIGS. 1 through 4 it will be seen that wire cable (10) with cable insulative layer (14) and cable outer semiconductive cover (12) is joined at bare ends by connector (16) having a central stop (17). Insulative sleeve (20) of the invention comprising outer semiconductive cover (24) and integrally bonded end caps (22), insulative section (26) and inner semiconductive section (28) is in position over the joint formed by connector (16) and overlapping the insulative layer (14) of the cable. End caps (22) are provided with grounding eyes (23) and are in contact with cable outer semiconductive cover (12) and provide terminations (18) of the sheathes. Inner semiconductive section (28) is constricted at ends (30) and (32) and is urged inward as seen at (38) in FIGS. 1 and 3 by constrictive boss (34) centered over connector (16) and longitudinal bosses (36). Said bosses urge semiconductive section (28) into contact with connector (16) and thereby achieve lower electrical resistance therebetween.

It will be apparent that various configurations of bosses may be used within the scope of the invention. The term is used herein to include protuberances which are round or may be elongated lengthwise of the sleeve or may extend circumferentially of the sleeve and form a constrictive ring. There must be at least one or more bosses centering on and urging electrical contact of the inner semiconductive section with the connector. Preferably contact should cover 10% or more of the surface of the connector.

Figure 5:
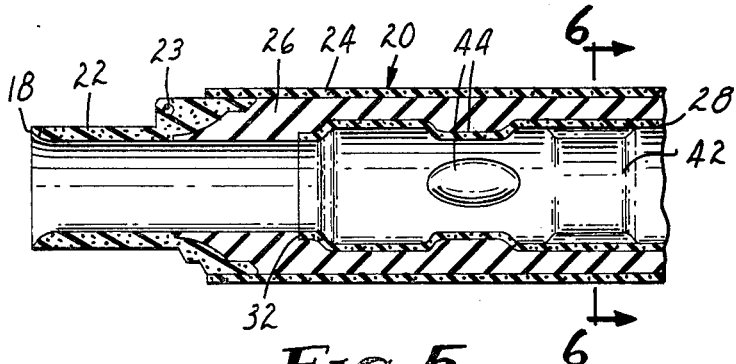
FIG. 5 shows a partial longitudinal section of another embodiment of the invention with no cable present.
Figure 6:
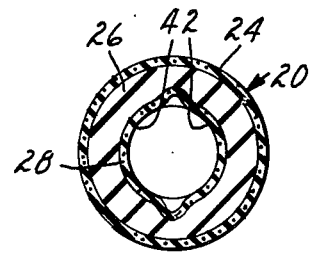
FIG. 6 shows a cross sectional view at 6—6 of the embodiment of FIG. 5.

A different embodiment is illustrated in FIGS. 5 and 6 where the central boss (42) is in two parts as shown in FIG. 6 and shorter bosses (44) are provided on either side thereof. One side of the embodiment only is shown, i.e., on the left side of center line 6—6.

Figure 7:
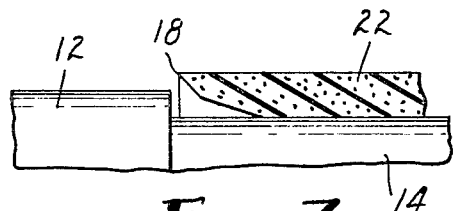
FIGS. 7, 8 and 9 show enlarged details of an outer end of an insulative sheath of the invention.
Figure 8:
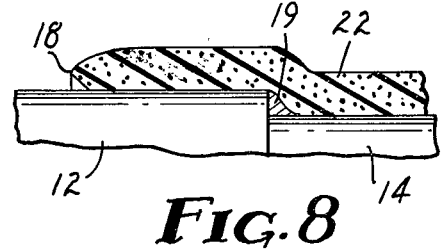
Figure 9:
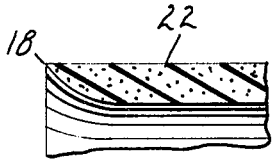
Figure 10:
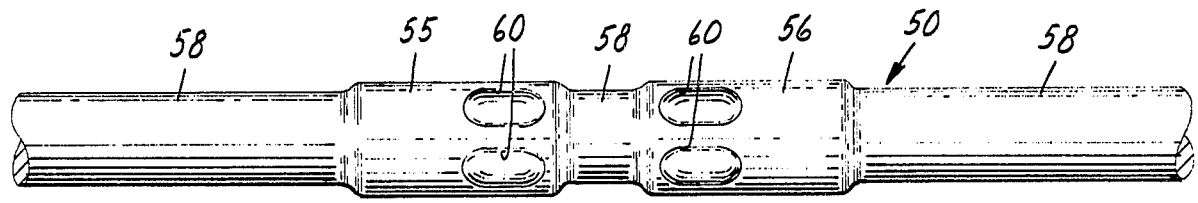
FIG. 10 shows a mandrel for forming the insulative sheath of the invention as shown in FIG. 1.

In FIGS. 7 and 9 are seen preferred terminations (18) for insulative sheathes of the invention. It is found to be advantageous for the termination to be at least doubly undercut or chamferred as shown in FIG. 7 so that lubricant is spread over the cable's insulation covering rather than being scraped away. The lubricant, suitably a silicone grease, is then accumulated as seen at (19) and thereby avoids the formation of an air pocket. The extreme of such multiple undercutting is a curved termination (18) as seen in FIG. 9 and this is here construed be included in the term at least doubly undercut. In FIG. 8 it is seen how termination (18) is drawn over cable outer semiconductive cover (12). It will be noted that the inner diameter of the sheath at termination (18) is approximately that of the outer diameter of the insulating covering of the cable and that termination (18) is thicker than cable outer semiconductive cover (12). Both proportions are found to be advantageous in avoiding inclusion of air and the doubly undercut to curved outer end of the termination segment of the end caps further assists in installation.

Figure 11:
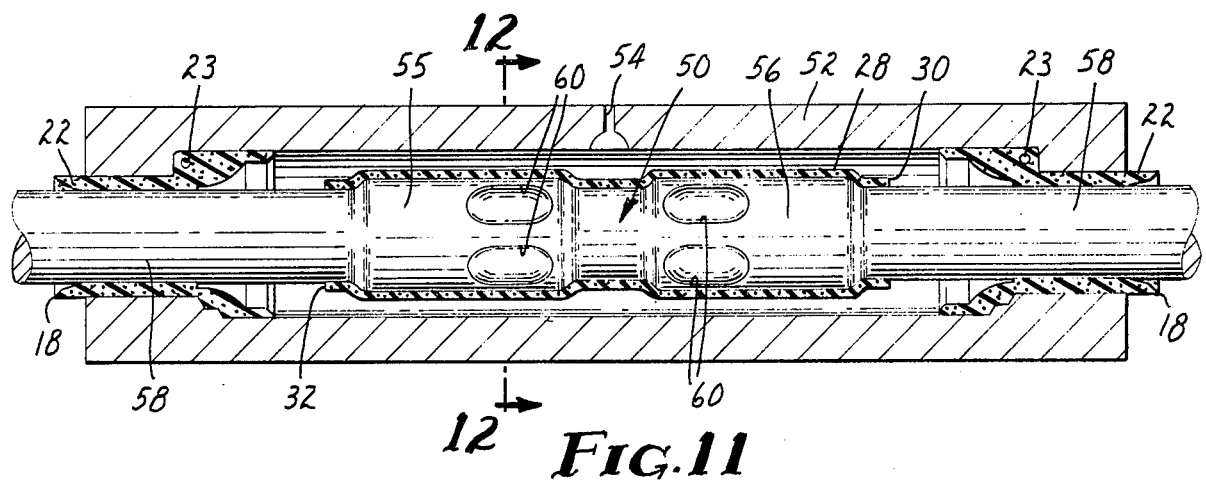
FIG. 11 shows, in a cut away view, how an insulative sheath of the invention is formed on the mandrel of FIG. 11.
Figure 12:
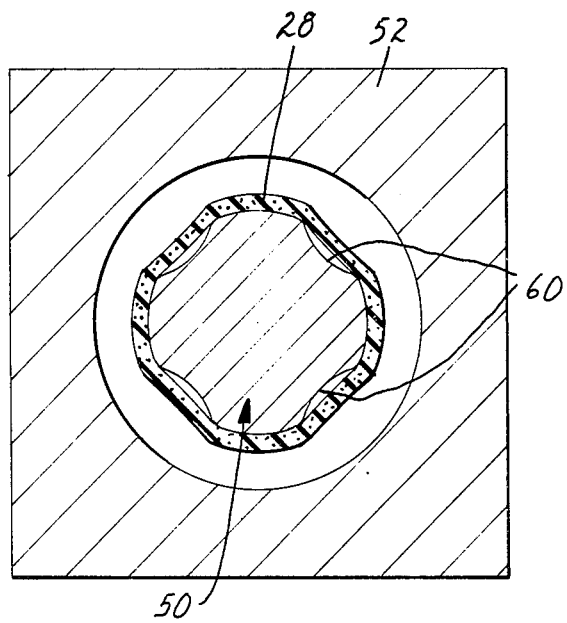
FIG. 12 shows a sectional view at 12—12 of FIG. 11 before injection of the insulative material.
Figure 13:
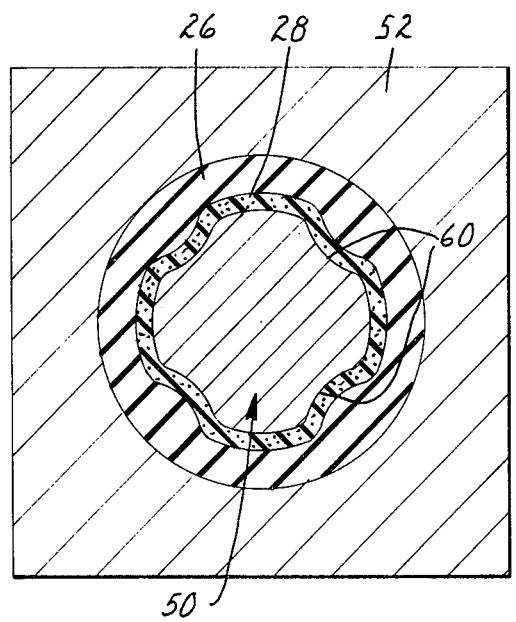
FIG. 13 shows a sectional view at 12—12 of FIG. 11 after insulative material has been injected.

In FIGS. 10–13 is seen a mandrel (50) for molding an insulative sheath of the invention as shown in FIGS. 1–4 inclusive. In FIG. 11 mandrel (50) is seen in form (52) with sprue hole (54) for injection of the insulative material of the sheath between end caps (22) and around inner semiconductive section (28). In this Figure it will be seen that the latter (28) is a piece of tubing which has slightly smaller diameter than the shaft (58) of the mandrel and hence conforms thereto and has substantially uniform thickness which is not materially altered by deformations thereof, for example over enlarged portions (55) and (56) of the mandrel. It will also be seen that depressions (60) are provided in mandrel (50) over which inner conductive section (28) stretches when in tube form as seen in FIG. 12 and into which it is forced with injection of insulative material forming insulative section (26) and hobs (36). The thickness of inner semiconductive section (28) is selected to carry the electrical load to which it is subjected and in view of its conductivity. A thickness of about 1 to 2 mm or slightly more is usually sufficient.

What is claimed is:

1. An insulative corona discharge suppressing shield for positioning over and along a splice in a high voltage cable of generally circular cross section having semiconductive covering, insulating covering and inner conductor and having an electrical connector electrically joining two bare ends of said conductor, said shield comprising two end caps of generally elongated tubular form having outer and inner ends and having outer termination segments of uniform internal and external diameter and inner enlarged segments having variable external diameter and internal diameter varying from being equal to the internal diameter of said terminal segment to being greater than the external diameter of said terminal segment, said end caps being adapted to engage said semiconductive covering electrically, annular inner and outer semiconductive sections and an insulative section having inwardly directed bosses over at least a portion thereof extending inward, said insulative section being integrally bonded at least to said inner semiconductive section and said end caps, said inner semiconductive section having a wall of substantially uniform thickness and further being urged inwardly by said bosses into electrical contact with said electrical connector when said shield is positioned on a high voltage cable splice.

2. Insulative corona discharge suppressing shield according to claim 1 wherein termination segments have double undercutting toward the internal diameter at their outer ends.

* * * * *